(12) United States Patent
Morris et al.

(10) Patent No.: US 8,775,332 B1
(45) Date of Patent: Jul. 8, 2014

(54) ADAPTIVE USER INTERFACES

(71) Applicant: InsideSales.com, Inc., Provo, UT (US)

(72) Inventors: Richard Glenn Morris, Sandy, UT (US); Xinchuan Zeng, Orem, UT (US); David Randal Elkington, Springville, UT (US)

(73) Assignee: InsideSales.com, Inc., Provo, UT (US)

( * ) Notice: Subject to any disclaimer, the term of this patent is extended or adjusted under 35 U.S.C. 154(b) by 0 days.

(21) Appl. No.: 13/916,600

(22) Filed: Jun. 13, 2013

(51) Int. Cl.
*G06F 17/00* (2006.01)
*G06F 17/20* (2006.01)
*G06N 7/00* (2006.01)
*G06F 9/44* (2006.01)
*G06F 3/0482* (2013.01)
*G06F 19/00* (2011.01)
*G06F 17/21* (2006.01)

(52) U.S. Cl.
CPC .............. *G06N 7/005* (2013.01); *G06F 9/4443* (2013.01); *G06F 3/0482* (2013.01); *Y10S 707/99933* (2013.01); *G06F 19/3406* (2013.01); *G06F 17/211* (2013.01)
USPC ..................................... 706/11; 707/999.003

(58) Field of Classification Search
CPC ....................................................... G06N 7/005
USPC ..................................................... 706/44, 11
See application file for complete search history.

(56) References Cited

U.S. PATENT DOCUMENTS

| | | | |
|---|---|---|---|
| 6,326,962 B1 * | 12/2001 | Szabo ........................... | 715/762 |
| 6,606,529 B1 * | 8/2003 | Crowder et al. .............. | 700/100 |
| 8,020,104 B2 * | 9/2011 | Robarts et al. ................ | 715/744 |
| 2005/0143138 A1 * | 6/2005 | Lee et al. ....................... | 455/566 |
| 2007/0282780 A1 | 12/2007 | Regier et al. | |
| 2008/0255941 A1 * | 10/2008 | Otto et al. ........................ | 705/14 |
| 2011/0246457 A1 | 10/2011 | Dong et al. | |
| 2012/0114197 A1 | 5/2012 | Zhang et al. | |
| 2012/0323853 A1 | 12/2012 | Fries et al. | |

* cited by examiner

*Primary Examiner* — Kakali Chaki
*Assistant Examiner* — Peter Coughlan
(74) *Attorney, Agent, or Firm* — Raubvogel Law Office

(57) ABSTRACT

According to various embodiments of the present invention, user performance and/or motivation for a computing system may be maximized by optimizing one or more target components of a user interface of the computing system. The target components may be aspects of the user interface that is perceived by the user. One or more input features and one or more output features may be identified, and data regarding these input and output features may be gathered. This data may be compared with the results generated by a set of candidate artificial intelligence algorithms to determine which of them provides the best fit with the data collected. Then, the selected artificial intelligence algorithm may be applied to the user interface to iteratively change the target components over time until the optimal settings for each user are discovered.

30 Claims, 7 Drawing Sheets

ADAPTIVE USER INTERFACES

CROSS-REFERENCE TO RELATED APPLICATION

The present application is related to U.S. Utility application Ser. No. 13/590,000 for "Hierarchical Based Sequencing Machine Learning Model", filed Aug. 20, 2012, the disclosure of which is incorporated by reference herein, in its entirety.

The present application is related to U.S. Utility application Ser. No. 13/725,653 for "Instance Weighted Learning Machine Learning Model", filed Dec. 21, 2012, the disclosure of which is incorporated by reference herein, in its entirety.

The present application is related to U.S. Pat. No. 8,352,389 for "Multiple Output Relaxation Machine Learning Model", filed Aug. 20, 2012 and issued Jan. 8, 2013, the disclosure of which is incorporated by reference herein, in its entirety.

This application is related to U.S. patent application Ser. No. 13/838,339 for "Resolving and Merging Duplicate Records Using Machine Learning", filed Mar. 15, 2013, the disclosure of which is incorporated by reference herein, in its entirety.

FIELD OF THE INVENTION

The present invention relates to techniques for adapting a user interface to enhance user motivation and/or performance, using artificial intelligence techniques such as machine learning.

DESCRIPTION OF THE RELATED ART

Many systems exist in which it would be desirable to enhance the motivation and/or performance of users of various types of software. In the business world, such systems include software-based gamification systems designed to enhance the operation of one or more sales professionals, such as a phone sales team. In the context of entertainment, video games and other online recreational activities benefit from a high degree of engagement among the user base. There are many other systems wherein it would be beneficial to enhance the motivation and/or performance of users of software systems.

Known systems often provide rewards for accomplishment of a given task. For example, in the context of a video game, new equipment, abilities, or "levels" for a player-controlled character, community titles, or challenge opportunities may be awarded to players based on accomplishing certain goals. In some cases, these rewards are meaningful to some players, but not to others. Each individual has his or own set of values, aesthetic preferences, and preferences. Accordingly, a "one size fits all" reward system may leave some users relatively unaffected.

Whether in an entertainment- or business context, the task of designing a reward system that is most effective for the largest possible group can be daunting. Numerous psychographic, behavioral, and historical factors affect the rewards that will be most effective for any given user. Accordingly, designing an optimal reward system, according to known methods, may take many hours' research with the involvement of diverse experts, focus groups of users, and considerable trial and error. At the end of all of this effort lies a solution that will, at best, only be effective for some of the users of the system.

The subject matter claimed herein is not limited to embodiments that solve any disadvantages or that operate only in environments such as those described above. Rather, this background is only provided to illustrate one example technology area where some embodiments described herein may be practiced.

SUMMARY

According to various embodiments of the present invention, systems and methods are provided to actively adapt to the user, so as to customize the user experience in real-time. The user experience can be adapted by changing system behaviors and/or aesthetics in order to maximize the motivation and performance of the user. Motivation may be measured in terms of activity levels (system use), where performance can be measured in terms of activity outcomes (such as sales made, games won, etc.). These adaptive user interfaces can be used to maximize user experience and performance for any application that has at least one of the following characteristics:

The application has the flexibility to use different patterns to interact with users. For example, an electronic video game may use a different color for an object on screen.

Using different patterns of interaction may have different effects on the user experience and performance.

Using different patterns of interaction may have different effects on different users (for example those with different personality types or demographics may respond differently).

For an application with the above characteristics, there may exist an optimal policy for each user, to maximize that user's experience and performance. This optimal policy may be different from that of other users. This invention may provide methods by which such optimal policies may be built. Example application domains include, but are not limited to:

Gamification systems to motivate employees (e.g. in sales)

Electronic video games

Electronic tutorial and educational systems

Electronic simulation and training systems

Lead response management and contact planning systems

Traditional applications (such as word processing, web browsing, email, etc.)

Operating systems

The policy may govern the manner in which one or more target components of the application operate. Each target component may be an aspect of a user interface with which the user interacts on an output device such as a display screen, speaker, or the like. Even though some components of the application may be customizable, in some situations they might need to remain static, for example to provide a level of consistency to the user experience that may be expected by the user.

Each target component may be optimized through the use of its own artificial intelligence algorithm, with different algorithms applied to different target components, as appropriate. In at least one embodiment, such artificial intelligence algorithms may be machine learning algorithms. The artificial intelligence algorithms may be selected through the use of a method that begins with identification of one or more target components to be modified. The target components may include, for example, messages delivered to the user by the application, content display on a display screen, adaptive rewards issued to the user through the application, and/or other aspects of the user interface.

One or more input features and output features of the application may also be identified for each target component.

The input features may be measurable aspects of the user or of the user's interaction with the application, such as a personality type of the user, a demographic to which the user belongs, an action pattern of the user relative to the user interface, and/or a variety of other characteristics. The output features may be measurements that are to be maximized or optimized through variation of the target components. For example, the output features may relate to user performance and/or motivation.

Data may then be collected with multiple measurements of the input and output features. This may be done retrospectively, i.e., with user input and/or actions that have already occurred, or prospectively, i.e., with new user input and/or actions.

Once the data has been collected, it may be compared with various candidate artificial intelligence algorithms to determine which of the candidate artificial intelligence algorithms provides the best match with the data collected for each target component. The best fitting candidate artificial intelligence algorithm may thus be selected for each of the target components.

The selected artificial intelligence algorithm(s) may then be applied to determine the optimal configuration for the target component(s). This may, for example, be done iteratively, by making successive changes to the target components until the optimal version of each target component is discovered (i.e., the version of the target component that yields the best value of the output feature or other indicator of performance or motivation that is to be maximized or optimized).

Further details and variations are described herein.

BRIEF DESCRIPTION OF THE DRAWINGS

The accompanying drawings illustrate several embodiments of the invention. Together with the description, they serve to explain the principles of the invention according to the embodiments. One skilled in the art will recognize that the particular embodiments illustrated in the drawings are merely exemplary, and are not intended to limit the scope of the present invention.

DETAILED DESCRIPTION OF THE EMBODIMENTS

System Architecture

According to various embodiments, the present invention can be implemented on any electronic device equipped to receive, store, transmit, and/or present data. Such an electronic device may be, for example, a desktop computer, laptop computer, smartphone, tablet computer, or the like.

Although the invention is described herein in connection with an implementation in a computer, one skilled in the art will recognize that the techniques of the present invention can be implemented in other contexts, and indeed in any suitable device capable of receiving, storing, transmitting, and/or presenting data, including data records in a database. Accordingly, the following description is intended to illustrate various embodiments of the invention by way of example, rather than to limit the scope of the claimed invention.

Figure 1A:
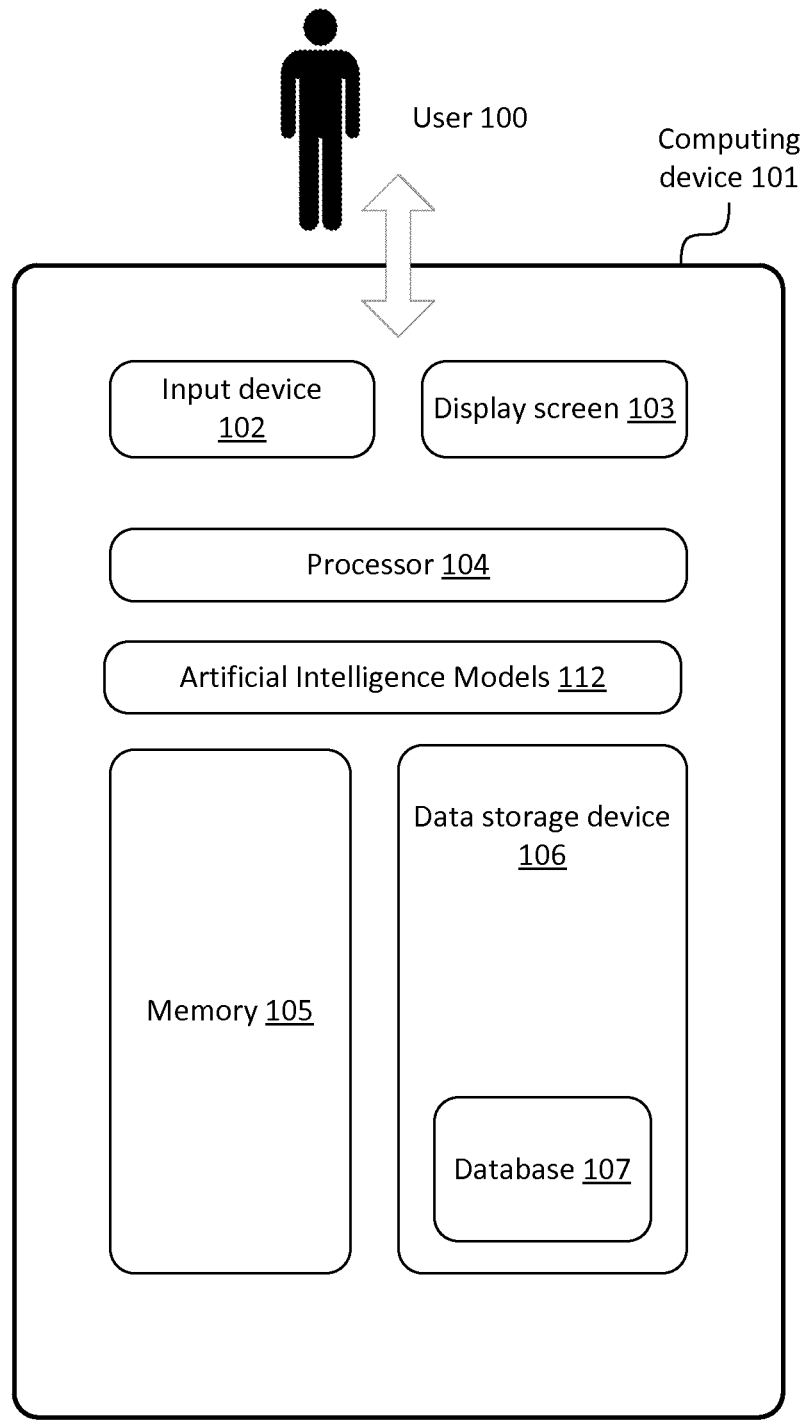
FIG. 1A is a block diagram depicting a hardware architecture for practicing the present invention according to one embodiment of the present invention.

Referring now to FIG. 1A, there is shown a block diagram depicting a hardware architecture for practicing the present invention, according to one embodiment. Such an architecture can be used, for example, for implementing the techniques of the present invention in a computer or other device 101. Device 101 may be any electronic device equipped to receive, store, transmit, and/or present data, including data records in a database, and to receive user input in connection with such data.

In at least one embodiment, device 101 has a number of hardware components well known to those skilled in the art. Input device 102 can be any element that receives input from user 100, including, for example, a keyboard, mouse, stylus, touch-sensitive screen (touchscreen), touchpad, trackball, accelerometer, five-way switch, microphone, or the like. Input can be provided via any suitable mode, including for example, one or more of: pointing, tapping, typing, dragging, and/or speech.

Display screen 103 can be any element that graphically displays a user interface and/or data.

Processor 104 can be a conventional microprocessor for performing operations on data under the direction of software, according to well-known techniques. Memory 105 can be random-access memory, having a structure and architecture as are known in the art, for use by processor 104 in the course of running software.

Data storage device 106 can be any magnetic, optical, or electronic storage device for storing data in digital form; examples include flash memory, magnetic hard drive, CD-ROM, DVD-ROM, or the like.

Data storage device 106 can be local or remote with respect to the other components of device 101. In at least one embodiment, data storage device 106 is detachable in the form of a CD-ROM, DVD, flash drive, USB hard drive, or the like. In another embodiment, data storage device 106 is fixed within device 101. In at least one embodiment, device 101 is configured to retrieve data from a remote data storage device when needed. Such communication between device 101 and other components can take place wirelessly, by Ethernet connection, via a computing network such as the Internet, or by any other appropriate means. This communication with other electronic devices is provided as an example and is not necessary to practice the invention.

In at least one embodiment, data storage device 106 includes database 107, which may operate according to any known technique for implementing databases. For example, database 107 may contain any number of tables having defined sets of fields; each table can in turn contain a plurality of records, wherein each record includes values for some or all of the defined fields. Database 107 may be organized according to any known technique; for example, it may be a relational database, flat database, or any other type of database as is suitable for the present invention and as may be known in the art. Data stored in database 107 can come from any suitable source, including user input, machine input, retrieval from a local or remote storage location, transmission via a network, and/or the like.

In at least one embodiment, candidate artificial intelligence models 112 are provided, for use by processor in determining the optimal versions of one or more target components of a user interface to maximize user performance and/or motivation. In at least one embodiment, such candidate artificial intelligence models 112 include machine learning models. The candidate artificial intelligence models 112 can be stored in data storage device 106 or at any other suitable location. Additional details concerning the generation, development, structure, and use of the candidate artificial intelligence models 112 are provided herein.

Figure 1B:
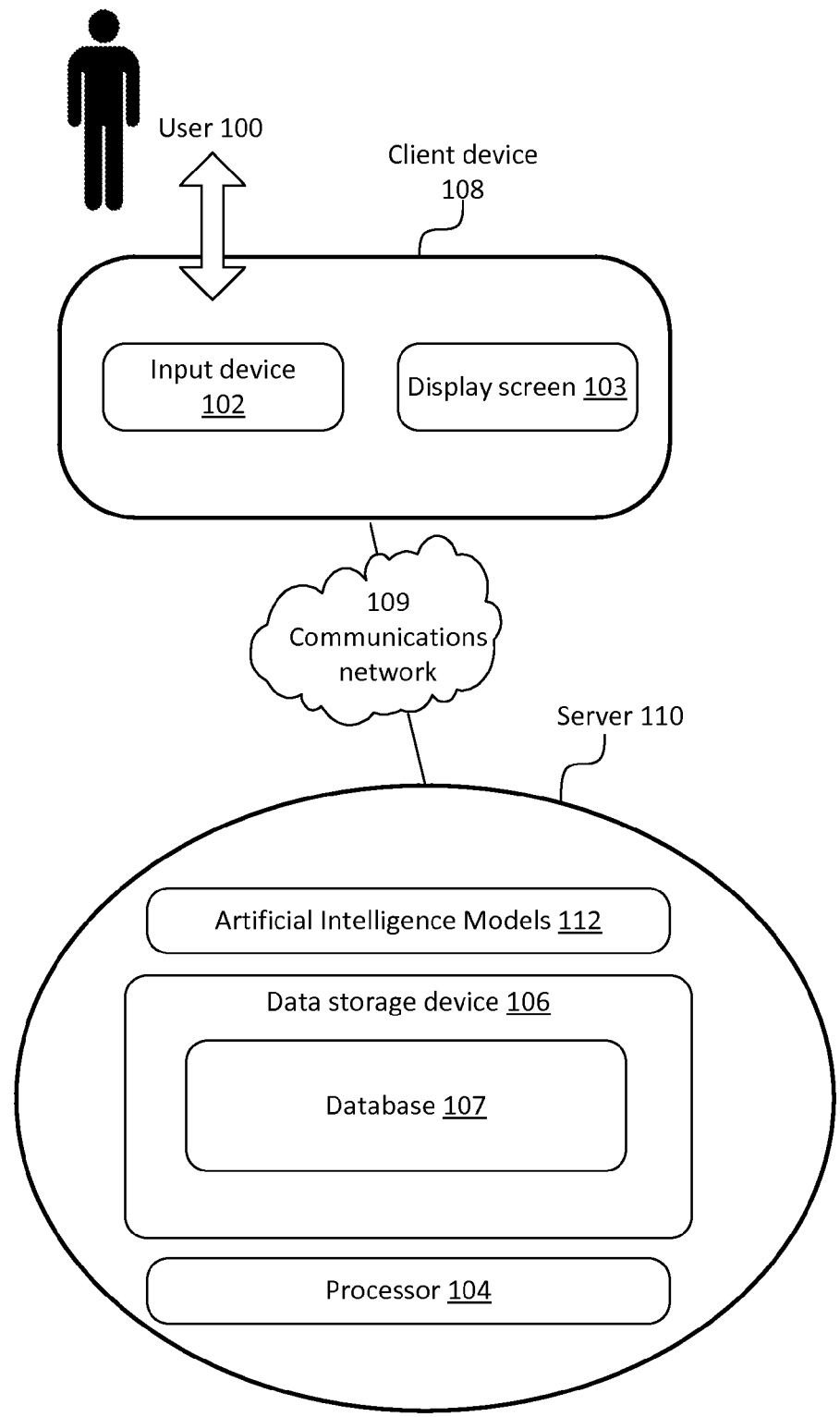
FIG. 1B is a block diagram depicting a hardware architecture for practicing the present invention in a client/server environment, according to one embodiment of the present invention.

Referring now to FIG. 1B, there is shown a block diagram depicting a hardware architecture for practicing the present invention in a client/server environment, according to one embodiment of the present invention. An example of such a client/server environment is a web-based implementation, wherein client device 108 runs a browser that provides a user interface for interacting with web pages and/or other web-based resources from server 110. Data from database 107 can be presented on display screen 103 of client device 108, for example as part of such web pages and/or other web-based resources, using known protocols and languages such as HyperText Markup Language (HTML), Java, JavaScript, and the like.

Client device 108 can be any electronic device incorporating the input device 102 and display screen 103, such as a desktop computer, laptop computer, personal digital assistant (PDA), cellular telephone, smartphone, music player, handheld computer, tablet computer, kiosk, game system, or the like. Any suitable communications network 109, such as the Internet, can be used as the mechanism for transmitting data between the client device 108 and server 110, according to any suitable protocols and techniques. In addition to the Internet, other examples include cellular telephone networks, EDGE, 3G, 4G, long term evolution (LTE), Session Initiation Protocol (SIP), Short Message Peer-to-Peer protocol (SMPP), SS7, WiFi, Bluetooth, ZigBee, Hypertext Transfer Protocol (HTTP), Secure Hypertext Transfer Protocol (SHTTP), Transmission Control Protocol/Internet Protocol (TCP/IP), and/or the like, and/or any combination thereof. In at least one embodiment, client device 108 transmits requests for data via communications network 109, and receives responses from server 110 containing the requested data.

In this implementation, server 110 is responsible for data storage and processing, and incorporates data storage device 106 including database 107 that may be structured as described above in connection with FIG. 1A. Server 110 may include additional components as needed for retrieving and/or manipulating data in data storage device 106 in response to requests from client device 108. In at least one embodiment, candidate artificial intelligence models 112 are provided, for use by processor determining the optimal versions of one or more target components of a user interface to maximize user performance and/or motivation according to the techniques described herein. The candidate artificial intelligence models 112 can be stored in data storage device 106 of server 110, or at client device 108, or at any other suitable location.

Overall Method

The system and method of the invention may be used either programmatically (machines make all of the choices), by an engineer (humans make some of the choices), or using some combination of the two. A program can be developed to act using the principles set forth in this framework to automatically generate artificial intelligence models to create adaptive user interfaces. There are five key steps that may be used to apply a new artificial intelligence-based approach:
- target component identification
- feature identification
- data collection
- artificial intelligence algorithm selection, and
- application of the selected artificial intelligence algorithm(s)

The framework may be formulated as follows. Given n different targets: $\{y_1, \ldots, y_i, \ldots, y_n\}$, such as widgets, notifications, content positioning, content display timing, etc., n artificial intelligence models can be built, for example as machine learning models $\{ML_1(x_1), \ldots, ML_i(x_i), \ldots, ML_n(x_n)\}$. Each $ML_i$ may be, for example, a different machine learning model for each different task $y_i$, with a different artificial intelligence algorithm (which may include machine learning algorithm(s) such as a genetic algorithm, Multi-Layer Perceptron, decision tree, support vector machine, etc.) and a different set of input features.

Each model $ML_i$ should be selected to best fit the target $y_i$. The model should be selected based on its performance in connection with the training data. The performance may be evaluated using, for example, 10-fold cross-validation. The difference in performance between models can be evaluated statistically using a statistical significance test, such as the student t-test.

The input features $x_i$ may be matched to best fit the model $ML_i$. An artificial intelligence based feature selection method may be combined with whatever input can be obtained from human experts. When there is little data available to train on, the input from human experts is especially valuable.

This method may be used to optimize user interface components in a wide variety of applications including gamification system for sales people, video games, or any other application in which user motivation and/or performance is to be maximized.

Application to be Optimized

Figure 2:
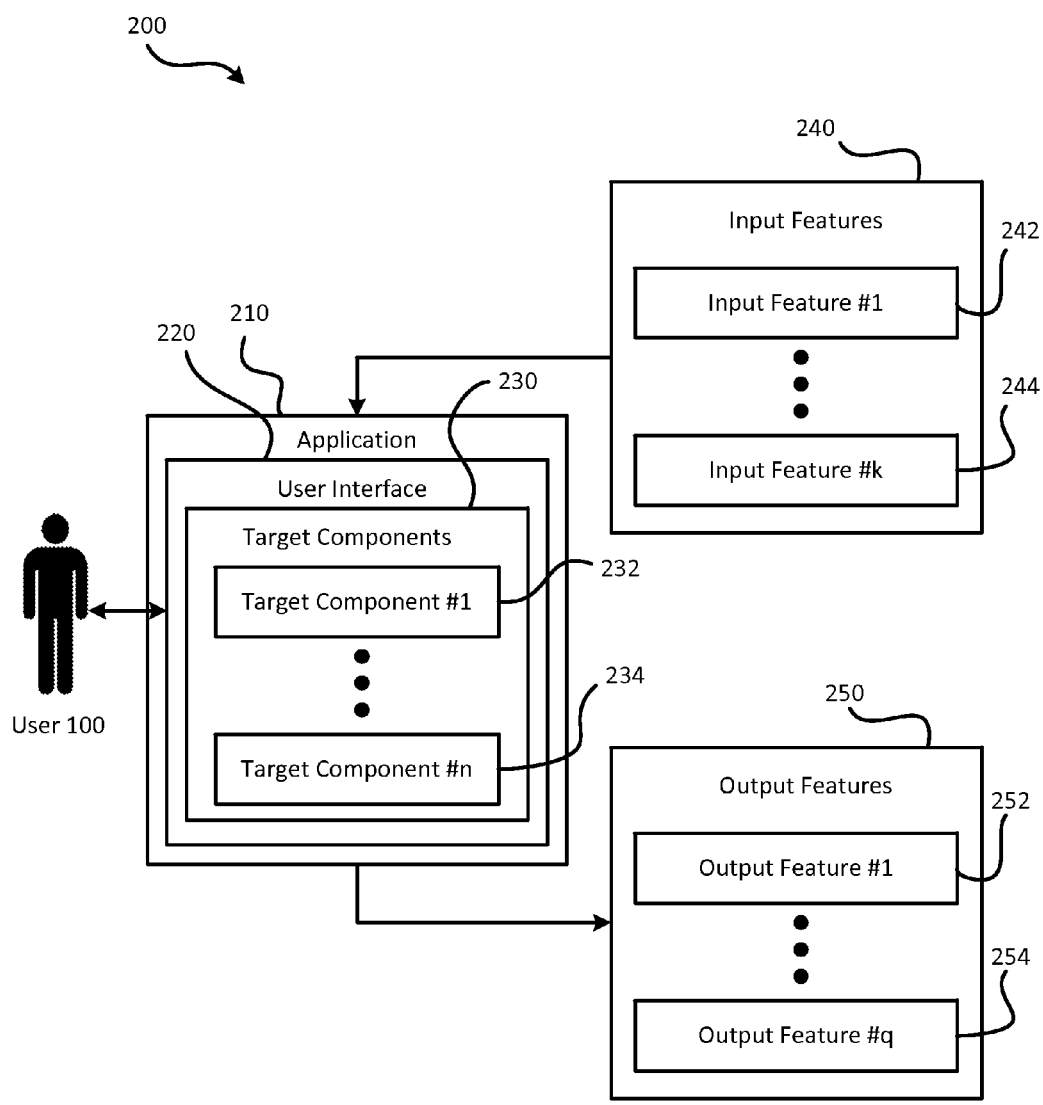
FIG. 2 is a schematic diagram depicting a computer application to be optimized according to one embodiment of the present invention.

Referring to FIG. 2, a schematic diagram depicts a system 200 having a computer application 210 to be optimized according to one embodiment of the present invention. The application 210 may be any of a variety of programs in which user performance and/or motivation are to be maximized. As mentioned previously, such programs may include gamification systems for sales or other business purposes, video games for entertainment, and the like. The application 210 may operate using, for example, the computing device 101 of FIG. 1A or the client device 108 of FIG. 1B.

The application 210 may have a user interface 220 that facilitates user interaction with the application 210. The user interface 220 may include a variety of components, each of which is an aspect of the user interface 220. Such components may include color palettes, icon selection and layout, the text used for messages to the user 100, sounds, artwork displayed, the speed with which the application 210 responds to input from the user 100, animations, and/or a wide variety of other user interface elements, as known in the art. The user interface 220 may be a graphical user interface (GUI), or may be text-based, or any combination thereof.

Any one or more of the components of the user interface 220 may be selected for alteration to maximize the performance and/or motivation of the user, and may thus define target components 230 of the user interface 220 (i.e., components of the user interface 220 that have been targeted for optimization through the use of artificial intelligence techniques such as machine learning, according to the invention). The target components 230 may include n target components. Thus, in FIG. 2, the target components 230 are illustrated with a first target component 232 and a plurality of additional target components up to an nth target component 234.

Examples of target components 230 that may be changed to maximize user performance and/or motivation include messages delivered to the user 100 through the user interface 220, content displayed to the user 100 over the user interface 220 (for example, on the display screen 103 of FIG. 1A or FIG. 1B), and adaptive rewards issued to the user 100 through notification from the user interface 220. Each of these target components 230 may be iteratively changed and, through measurement of the corresponding impact of the change on user performance and/or motivation, optimized via artificial intelligence techniques such as machine learning according to the invention.

A plurality of input features 240 may be applicable to the user 100 or to interaction of the user 100 with the user interface 220. The input features 240 may include k input features. Thus, in FIG. 2, the input features 240 are illustrated with a first input feature 242 and a plurality of additional input features up to a kth input feature 244.

The input features 240 may include any known characteristics of the user 100. Such characteristics may include, for example, a user personality type of the user 100 such as the score or position of a user 100 in a variety of personality aspects. A variety of known personality classification schemes may be applied, such as Myers-Briggs, Big Five, Persogenics, standard IQ tests, and standard EQ tests.

Alternatively, such characteristics may include a user demographic of the user 100. User demographics may include information such as the education, work experience, location, household size, age, ethnicity, hobbies, political preferences, and/or other aspects of the user 100. It may be difficult to predict which demographic aspects will affect the appropriate artificial intelligence algorithm for optimization of the target components 230. Thus, a relatively wide range of such demographic information may be collected, if desired. Such demographic information and/or the personality information mentioned above may be collected directly from the user 100, through queries administered to the user 100 through the user interface 220, or from a third party that obtains the information from the user 100.

Additionally or alternatively, the input features 240 may include aspects of the interaction of the user 100 with the user interface 220. These may include actions such as clicking patterns with a mouse or other input device, pattern of navigation through menus, tabs, or icons, achievements or rewards issued to the user 100 through the user interface 220, or the like. Such actions may be measured and logged directly by the application 210, without the need to query the user 100 or any third-party resource.

A plurality of output features 250 may also be applicable to the user 100. The output features 250 may include q output features. Thus, in FIG. 2, the output features 250 are illustrated with a first output feature 252 and a plurality of additional output features up to a qth output feature 254.

Each of the output features 250 may be a measurable aspect of the activities of the user 100 that is tracked by the application 210. The output features 250 may thus be the measurements of performance and/or motivation of the user 100 that are to be maximized according to the invention.

The output features 250 may measure performance and/or motivation of the user 100 relative to actions taken with the application 210, as in the case of a video game system. The point score, level achievement, or other achievements relative to actions taken by the user 100 in the course of working with the user interface 220 may thus be tracked and used to provide the output features 250 as indicators of user performance.

Where motivation is to be measured, the output features 250 may be derived from less obvious aspects of interaction of the user 100 with the user interface 220 in an attempt to measure the level of engagement or excitement of the user 100. Such aspects may include, for example, the time between user clicks of a mouse, the willingness of the user 100 to re-attempt a task that was unsuccessfully attempted previously, user activities to check on his or her own performance, or the like. Such aspects may be measured directly by the application 210 to generate the output features 250.

Alternatively, the output features 250 may relate to aspects of user performance and/or motivation that originate outside the interaction of the user 100 with the user interface 220. Such aspects may be tracked through the use of the application 210. For example, in the context of a gamification system to maximize sales performance, the application 210 may be used to track sales made through the application 210 itself, for example, on an on-line sales platform. However, the application 210 may also be used to track sales that are made in-person, over the phone, or through other channels in which the application 210 is not involved.

The application 210 may be, for example, a sales tracking system, scheduling system, ERP system, or other software system that provides such tracking. The output features 250 may include, in the context of a sales gamification system, metrics such as number of sales in a given time period, sales dollar volume in a given time period, average sale amount, number of new prospective sales or other contacts, sales rank in comparison with other users, or other metrics.

The input features 240 and/or the output features 250 may be specific to a single user 100, or may apply to a group of users. Thus, the input features 240 may include information that is shared by all users of the group, or that is an average value among the users in that group. Similarly, the output features 250 may represent the aggregate performance of the group, the average performance of the group, any other metric defining the performance and/or motivation of the group of users. In at least one embodiment, some form of affinity can be established or determined among a group of two or more users, so that information about one user in the group can be used for others in the group.

Optimization System

Figure 3:
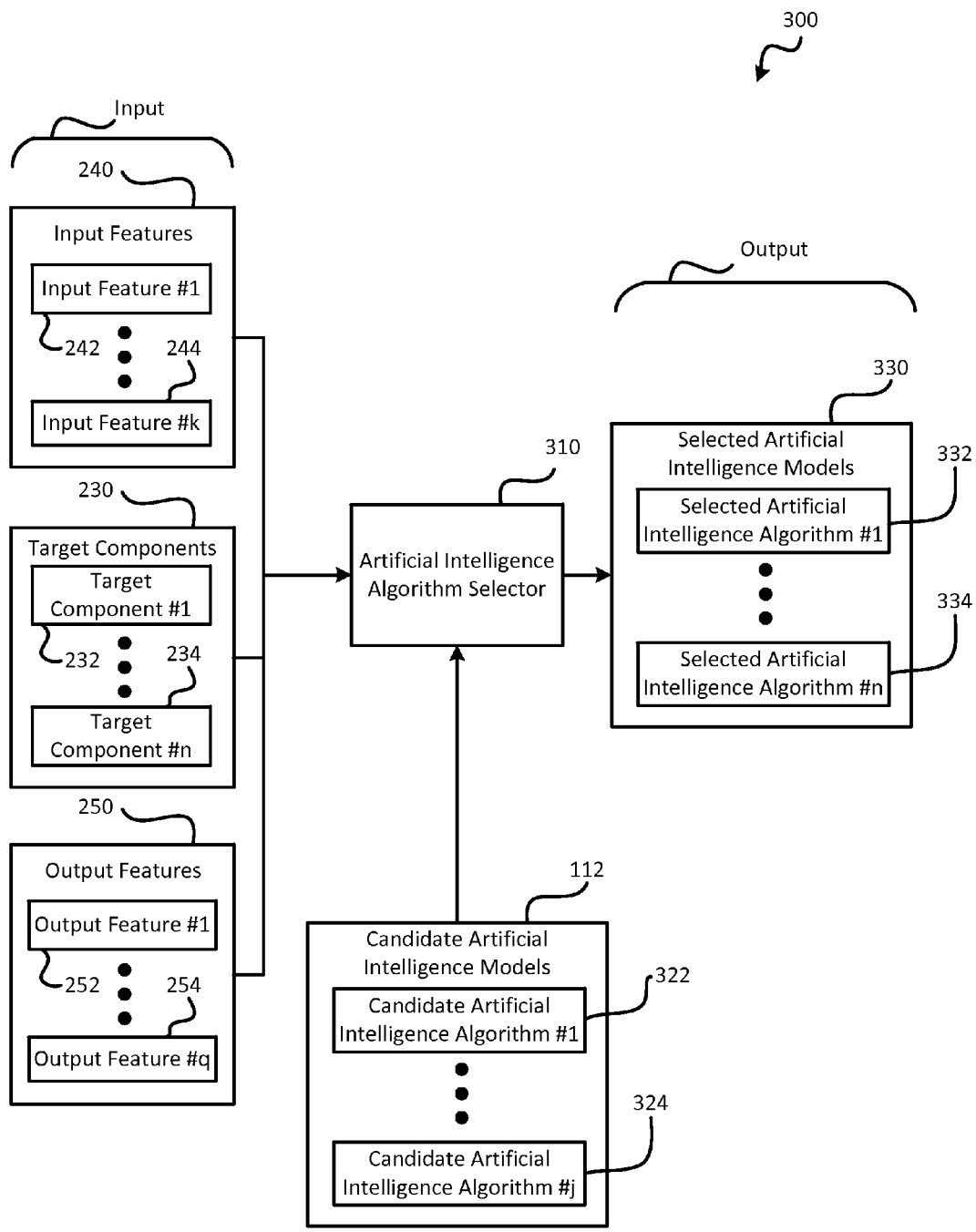
FIG. 3 is a schematic diagram depicting an optimization system according to one embodiment of the present invention.

Referring to FIG. 3, a schematic diagram depicts an optimization system 300 according to one embodiment of the present invention. The optimization system 300 may also operate on a computing system such as the device 101 of FIG. 1A and/or the client device 108 of FIG. 1B.

The optimization system 300 may include an artificial intelligence algorithm selector 310 that selects the optimal artificial intelligence algorithm from the candidate artificial intelligence models 112 for each of the target components 230 that is to be optimized. The machine algorithm selector 310 may be integrated with the application 210, or may be a separate module in communication with the application 210.

In alternative embodiments, the machine algorithm selector 310 may be a separate program hosted on a computing system apart from that which hosts the application 210 of FIG. 2. The results of the operations carried out by the machine algorithm selector 310 may be loaded into the application 210 to provide the desired optimization of the target components 230.

As shown, the machine algorithm selector 310 may receive a number of inputs, which may include the target components 230, the input features 240, and/or the output features 250. If desired, the machine algorithm selector 310 may receive other inputs as well.

The candidate artificial intelligence models 112 may include j candidate artificial intelligence models including a first candidate artificial intelligence algorithm 322 and plurality of candidate artificial intelligence algorithms up to a jth candidate artificial intelligence algorithm 324. The candidate artificial intelligence models 112 may include any of a variety of artificial intelligence models and/or machine learning algorithms including, but not limited to the following:

instance weight learning algorithms
    genetic algorithms
    single-layer perceptrons
    multi-layer perceptrons
    decision trees
    support vector machines
    naïve Bayes classifiers
    nearest neighbor-based algorithms
    neural nets
    hierarchical based sequencing algorithms, and
    multiple output relaxation algorithms The candidate artificial intelligence models 112 may also include derivatives and/or combinations of any of the foregoing, or of any other known artificial intelligence algorithm. The machine algorithm selector 310 may be connected to the candidate artificial intelligence models 112 so that the machine algorithm selector 310 is able to retrieve any of the candidate artificial intelligence models 112 for testing and/or use in the optimization process.

The machine algorithm selector 310 may receive the various inputs, including the target components 230, the input features 240, and/or the output features 250 and compare these inputs to the results that would be obtained by application of the candidate artificial intelligence models 112. The machine algorithm selector 310 may select the particular algorithm of the candidate artificial intelligence models 112 that is most appropriate for optimization of each of the target components 230.

Thus, where there are n target components 230 to be optimized, the output of the machine algorithm selector 310 may include n selected artificial intelligence models 330. The selected artificial intelligence models 330 may include a first selected artificial intelligence algorithm 332 to be used for optimization of the first target component 232, an nth selected artificial intelligence algorithm 334 to be used for optimization of the nth target component 234. Further, the selected artificial intelligence models 330 may include a plurality of additional selected artificial intelligence algorithms from the first selected artificial intelligence algorithm 332 to the nth selected artificial intelligence algorithm 334 that are to be used for optimization of the target components 230 between the first target component 232 and the nth target component 234.

As mentioned previously, the optimization of more than one of the target components 230 is optional. If desired, only a single target component 230 may be optimized (e.g., the first target component 232), in which case the output of the machine algorithm selector 310 may be only a single selected artificial intelligence model 330 (e.g., the first selected artificial intelligence algorithm 332).

Optimization Method

Figure 4:
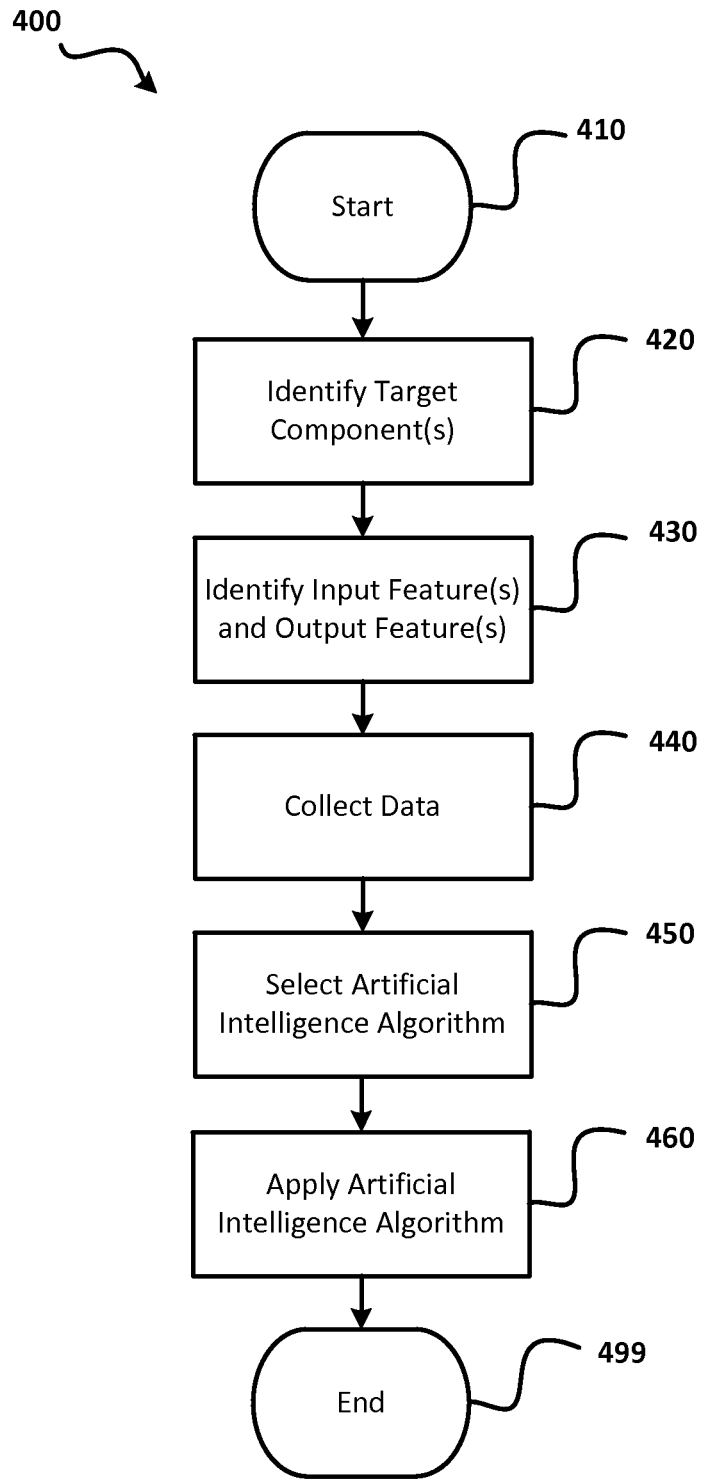
FIG. 4 is a flowchart depicting an optimization method according to one embodiment of the invention.

Referring to FIG. 4, a flowchart depicts an optimization method 400 according to one embodiment of the invention. The optimization method 400 may utilize the optimization system 300 of FIG. 3, and may be applied to a system 200 including an application 210 such as that of FIG. 2.

Target Component Identification 420

The optimization method 400 may start 410 with a step 420 in which the target components 230 are identified. As mentioned previously, the target components 230 may be those aspects of the user interface 220 that are to be optimized to maximize the performance and/or motivation of the user.

These target components 230 may include, for example, widgets, notifications, content positioning, content display timing, content display animations and aesthetics, target metrics, system behavior (such as opponent behavior in a video game or call length/frequency in a sales system), and system sounds (alerts, dings, music/soundtracks, etc.).

As an aside, when the machine algorithm selector 310 has collected sufficient data, the selected artificial intelligence models 330 can be used in reverse. This can be done to fill in missing information for users, fix any information that may have been misrepresented by the user, or make more informed decisions about those that are not users of the system 200. Such reverse utilization of the single selected artificial intelligence model 330 may be used, for example, for business leads for a lead management platform.

Message Generation

Messages may be generated to communicate information to the user. These messages may be customized based on personality profile, demographics, and/or performance. For a given fact, such as a sales representative has just become the lead of the group for "number of calls per day," there may be different ways to convey the message for the same fact, for example, "You are the leader of your group on number of calls per day." can have a different impact than "Congratulations! You are the number one in your group for number of calls per day!" The optimization method 400 may select a message from among candidate messages so that it best fits the user 100 to whom the message is sent.

For a given fact i, a set of messages may be generated: $M=\{m_1, m_2, \ldots, m_k\}$. An initial set of seed messages may be selected manually, generated off of training data (using typical language modeling techniques on a training corpus), or from a set of previously generated messages.

A dictionary can be used to find synonyms for words or phrases for each meaningful word (such as a noun, adjective, adverb, etc.). Important words (such as those defining the metric, or that a critical to conveying the message) should be left as static and not changed throughout this process. The set of messages M may be expanded using these new words and phrases. If necessary, a part-of-speech tagger may be applied to identify parts of speech (to enable the synonym discovery task).

The set of messages can also be expanded using grammar structures that reflect the same meanings (for example using different orders of words, using active vs. passive voice, etc.). If necessary, a parser can be applied to build a parse tree, and grammar rules can be applied to list all possible alternative grammar structures.

For each candidate in M, a frequency rating may be assigned: $FR=\{fr_1, fr_2, \ldots, fr_k\}$. The frequency rating may reflect the frequency (or popularity) of use of the message in the real-world. An FR score can be estimated by using a search engine for each message as follows: $fr_i = num_i/num\_max$ where $num_i$ is the number of search results returned when $m_i$ is entered into a search engine, and num_max is the maximum from $\{num_1, num_2, \ldots, num_k\}$. If $|M|$ becomes too large, the system may discard candidate messages with low FR scores, keeping only the top N (using a value such as N=100).

For a given user u, $x_u$ may be the data for that user. This may include different components such as personality information (i.e. a personality profile), demographic information, and historical information (including past system usage, previous actions, achievements, and other data).

An impact factor imp(z) may be calculated for a given fact z (such as breaking a record). The impact factor for some facts may be higher by default than others (i.e. breaking a record may have a bigger impact than taking the lead in the group). Other things may be taken into account when calculating impact factor, such as the length of time a record has been standing when it is broken (for example, a record that has lasted a year as opposed to one that has only lasted an hour). Higher imp(z) scores may indicate that the message should have a stronger tone and greater emotion, whereas low scores may indicate that a more subdued message should be used.

Given a fact z, a user u, and data $x_u$, an artificial intelligence model may be able to make a prediction and generate a ranked list of messages among k candidates: $M=\{m_1, m_2, \ldots, m_k\}$. The inputs to the model may include $x_u$ and imp(z). The artificial intelligence model may generate a list of scores for k candidate messages $y=\{y_1, y_2, \ldots, y_k\}$. The final score may be combined with the frequency rating FR, for example using a formula such as $score_i=\phi \cdot y_i+(1-\phi) \cdot fr_i$ where $\phi$ is a parameter that defines the weighting between the procedurally determined frequency (or popularity) of a message and the artificial intelligence determined score. One skilled in the art will recognize that other formulas can be using, including for example those that include nonlinear functions. The top N messages may be selected from the list (sorted by score) to define selected messages. If the top N messages contain similar scores, it may be possible to pass them to another artificial intelligence module to make the selection using other factors.

Training data used to train the artificial intelligence algorithm may be collected based on results of messages that have been displayed in real-world settings. Such results can be expressed, for example, in terms of a quality value, based on actual results, user ratings, and/or other factors. When there is insufficient data to train the artificial intelligence model, the weight parameter may be set low (to weight towards FR) and increase incrementally as more training data is gathered.

Content Display

Different methods of displaying adaptive content (such as widgets and notifications) may motivate users differently. The optimization method 400 may optimize the manner in which content is presented to the single user 100. This may include, but is not limited to, the following items:

Positioning—Where to display the content (such as upper-right-corner, lower-left-corner, or center)

Length/Timing—When and how long to display the content (such as immediate or delayed)

Animations and Aesthetics—How to display content (includes animations, colors, fonts, etc.)

For a given user u, let $p_u$ be the content presentation policy, which is the policy that is used to determine how to present content to the user. For example, $p_u$ may include what content to present, when, and how to present content. The policy $p_u$ may include multiple decision components ($p_{u,1}, p_{u,2}, \ldots, p_{u,n}$). As an example, for a gamification system for sales people, $p_u$ may include any or all of the following:

The type of widgets or key performance indicators (KPIs)

The type of metrics for widgets; or key performance metrics (KPMs)

The type of notifications to display

The timing of notifications

The length of time to display notifications

The positions of widgets and notifications

Whether or not to animate the contents of a widget or notification

How to animate widgets or notifications

Colors for components and backgrounds

Other aesthetics (such as fonts)

To customize the content display, the task is to give the optimal content display policy $p_u$ for each user u. This content presentation policy can be constructed by hand using human experts, although such an approach may require excessive amounts of time and expertise to generate a good policy. Manual approaches may also have limited scalability as the number of inputs, components, and decisions increase. Human experts may also be unable to find complicated patterns and correlations among a large number of inputs and decision components. It may be difficult for human experts to quantify patterns and correlations among components. This would also make adapting to new data difficult and costly.

For these reasons, in at least one embodiment, an artificial intelligence based approach, using, for example, machine learning, is used to create a content presentation policy. In at least one embodiment, a human-created policy may be useful in order to be used initially before there is enough training data to develop a reliable artificial intelligence model. Each human-generated policy may be assigned a confidence level based on how confident the expert is that the policy is optimal. The confidence level may be in the range [0, 1]. For large values (those close to 1), the artificial intelligence model may adapt the human-generated policy slowly. For smaller values (those closer to 0), the artificial intelligence model may adapt the human-generated policy much faster. This rate of adaptation may be customizable by users (or managers in a group setting).

To build a policy using artificial intelligence, there may be n different decision components: $p=(p_1, p_2, \ldots, p_n)$. The optimization method 400 may build n artificial intelligence models such as machine learning models $\{ML_1(x_1), ML_2(x_2), \ldots, ML_n(x_n)\}$. Each $ML_j$ may be the artificial intelligence model for decision component $p_j$, and each $x_j$ may be the input feature vector for $p_j$. For a given user u, the input user data $x_u$ may be fed into n ML models, and then the system may retrieve output results from the artificial intelligence models to create the optimal policy $p_u=(p_{u,1}, p_{u,2}, \ldots, p_{u,n})$ to present contents to the user u.

In order to ensure a certain level of consistency from one iteration to the next, in at least one embodiment the optimization method 400 only allows possible changes that are relatively small. If a user interface changes too quickly, user satisfaction may suffer (and thus, user performance may suffer as well) due to undesired user awareness of the change. To this end, a utility can be used that measures the difference between two different user interfaces. This may be done by calculating distances between content (e.g. the distance between the location of item x on interface a and the location of that same item x on interface b), calculating differences in colors, determining whether there is a difference between content that would be displayed, etc. The permissible change may then be limited to a maximum change, as quantified by this procedure or specified by a configurable threshold.

Adaptive Rewards

The target components 230 may also include adaptive rewards that are issued through the application 210 based on accomplishments of the single user 100. These adaptive rewards may take a variety of forms including badges, achievements, challenges, etc., and may be achieved on a daily, weekly, monthly or yearly basis, or may be based on other time frames or start and end points. Each adaptive reward may be issued to the user 100 based on award criteria and/or goals, which may user-specific. Thus, adaptive rewards may be varied based on the individual user 100, based on the group of which the user 100 is a part. Alternatively, adaptive rewards may be issued based on a variety of other factors that may or may not depend on the individual user and may or may not be visible to the user 100.

Each adaptive reward may be assigned a specific rating that equates to a reward schedule. Each KPI may have a specific amount of "effort" associated with it. This effort may be aggregated to compute how much is needed to achieve each goal. This effort may be scaled by a per user (or per group) value to give custom goals for each user. At the end of the applicable award time period, the optimization method 400 may calculate how much the per user scale factor needs to be modified. This may range from [−1, 1] (signifying a −100% to a +100% decrease/increase). This equation may be used: change=discount·[(target_time−elapsed_time)/target_time]·base_amount.

For example, if there is a metric called calls, that has a base "effort" value e of 2, and there is a user u, the system may try to learn the appropriate scale score for that user σ. The scale score may be initialized to σ=1. A goal g with an effort rating of 100 may be achievable every day. For u to achieve g, u would have to make $(g_{rating}/e)\cdot\sigma$ calls, or $calls_{day}=(100/2)\cdot 1=50$. If u takes 2 days to achieve g, then (using a discount of 0.5): $\sigma=\sigma+[(1-2/1)\cdot 0.5\cdot\sigma]=1+(-1\cdot 0.5\cdot 1)=1-0.5=0.5$. Thus, for u to achieve goal g again, it would take $calls_{day}=(100/2)\cdot 0.5=25$.

The system may be used to check how agents are performing and what they are focusing on. Agents with low overall scale scores can be seen as low performers. Likewise, agents with high scale scores can be seen as high performers. The system may have caps on either end, to prevent high performers from getting rewards that are too low (extra rewards encouraging high performance) and to prevent low performers from getting rewards that are too high (lack of rewards discouraging low performance). Managers and/or administrators may be given control over the effort scaling values σ so that they can intervene if a user is found to be gaming the system (for example, if they intentionally perform slowly for a few days to drive down values so that they can maximize on a single, occasional, high performance day). Effort scaling scores may be on any suitable basis, such as for example one per user basis, one per metric basis, or one per goal.

The system may also perform learning on the meta level. If a user (or group) has consistently low performance, a target schedule may be reduced. Similarly, if a user or group has consistently high performance, the target schedule may be increased. Thus, the optimization method 400 may keep rewards from becoming too frequent or infrequent.

The system may also be adapted to provide rewards when an event occurs, such as taking the lead in the team for a given metric or breaking a record. The adaptive reward may be scaled based on how long the previous leader was in first place, if the score needed to pass the leader was unusually high, or how long the previous record was held.

Input and Output Feature Identification 430

Once one or more target component 230 has been identified, the optimization method 400 may proceed to a step 430 in which one or more input features 240 and one or more output features 250 are also identified. This process may be termed "feature engineering."

A set of input features x may be identified for use with the artificial intelligence model. The set of input features may identify the data to be collected to build a model. These features may include any aspect of the system 200, the single user 100, or the manner in which the single user 100 works with the system 200. A pre-made set of features may be provided to facilitate selection of the input features (so that the framework can be used in a more automated fashion), or entirely custom input features may be used for each target component 230. A target output feature may also be identified and may be the item that is to be maximized. The output feature may be engineered to be a composite output feature formed by combining several different performance metrics (using any mathematical function to combine them), or may be a single performance metric. Multiple independent and separate output features may alternatively be used.

Feature engineering may also be used to build composite features by deriving them from primitive features. Some of them may be built based on input from human experts. Some of them may be built using artificial intelligence methods. For example, a composite feature may be extracted from a hidden node in a trained Multi-Layer Perceptron (this may reflect a higher-order feature that is a combination of primitive features from input nodes).

Each input feature $x_{i,j}$ (the jth feature of $x_i$) may be assigned a different weight $w_{i,j}$ based on training and/or estimation from human experts or on input from human experts. The weight $w_{i,j}$ can be used in model $ML_i$ in various ways. For example, for a nearest neighbor algorithm, the distance between two points in a feature space can be weighted by the weight $w_{i,j}$.

Training instances may not all be of equal value or quality. Some may be noisier or less influential than others. Some instances may have more unknown values than others or the instance labeling might be of varying reliability. Each training instance may be assigned a different weight, or score, to reflect its quality. In at least one embodiment, an Instance-Weighted Learning method, such as that described in above-referenced U.S. Utility application Ser. No. 13/725,653 for "Instance Weighted Learning Machine Learning Model", filed Dec. 21, 2012, may be used to improve the performance of model training.

Examples of features that can be used include the following:

User personality type
User demographics
Actions (in a sequence)
Engineered/composite features Engineered (composite) features may be derived from other data fields. For example, an engineered feature experience may be derived from several demographic fields such as "Years in current job," "Years in related jobs," "Years of education in related fields," etc.

Another example of an engineered feature is proactiveness or aggressiveness, which may be derived from several personality features. For big-five personality profiles, it may be related to the degree of extraversion and agreeableness. It can also be partially derived from previous performance data, such as average number of initialized calls, or average talking time per call (as compared to average metrics of other people in the same job position).

As a third example of an engineered feature, a boolean feature is_proactive_experienced_sales_rep may be derived from a combination of personality features and demographic features, such as using a combination of the previously-presented engineered features experienced and aggressiveness.

User Personality Types

The optimization system 300 may benefit from access to a personality type for the user 100. The personality type may facilitate the optimization process.

A personality type can be obtained either implicitly or explicitly. Personality types may be obtained implicitly by collecting user information as tuples: (demographics; actions). These tuples may then be used in an unsupervised learning fashion to obtain groupings of users using, for example, common clustering algorithms (such as k-means). Each cluster may represent a different personality type. These personality types may be used in other portions of the user interface 220 to improve the accuracy of the adaptation.

If a set of target personality types is identified, personality type information about users may be obtained explicitly. Initially, users may provide their personality types. After enough information has been gathered, a classifier may be built to identify future users' personality types. This classifier may use a training data set that consists of tuples of user information (demographics, actions) as the input and the personality type as the target to be learned. The classifier may be any that is common in the field, such as support vector machines, multi-layer perceptrons, naïve Bayes classifiers, decision trees, and any ensemble methods. In this way, the personality type of future users may be identified automatically, without need for manual input.

Each different personality test may have a different set of benefits. Any known personality test may be used to determine a set of valid personality profile labels. Examples of these include Myers-Briggs, Big Five, Persogenics, standard IQ tests, and standard EQ tests.

User Demographics

Additionally or alternatively, the optimization system 300 may also benefit from access to demographic data for the user 100 and/or any group to which the user 100 may belong, including the company that employs the user 100 and operates the system 200. The following is a non-exclusive list of demographic features that can be used:

Education (Education level, education type, GPA)

Work Experience (Job title, job function, professional certificates, years of experience in current job, number of previous jobs, average duration per job, previous job title, previous job position, and/or income level)

Location

Household size

Home owner or renter

Birth year

Social media information (Number of LinkedIn connections; number of followers, tweets, retweets on Twitter, number of friends in Facebook, and/or size of circles in Google+)

Hobbies (Favorite music favorite sports to participate in, favorite sports to watch)

Company information (company size, company industry, company sub-industry, company annual revenue, company growth rate, company type, i.e., public, private, venture-backed, etc., team size)

This is only a partial list; any of a wide variety of demographic data may be used to expedite machine learning, facilitate the selection of the appropriate artificial intelligence algorithm, and/or help fine-tune the results.

Action Data

Additionally or alternatively, the input features 240 and/or output features 250 may include data pertaining to actions taken by the user 100 relative to user interface 220. The optimization system 300 may record such actions to use in determining and learning from user behavior. The historical data of actions can be used as a part of the input features into a learning algorithm used for an adaptive user interface. Some examples of actions that can be used include, but are not limited to:

Click stream (click patterns)

Time between clicks

Menu/tab navigation

Record creation, reading, updating, and deleting

Real-world actions (such as calls, appointments, sales, etc.)

Login/Logout

Changes to preferences or settings (changing fonts, colors, positions, etc.)

Days since last login

Number of rewards (average and most recent session)

Number of badges/achievements (average and most recent session)

Number of times reaching goals (average and most recent session)

Ranking within the team or company

Time between receiving and replying to messages

For each user u, a sequence of data can be collected with t=1, 2, ..., m, where t may be a session in the sequence. The definition of a session may be different depending on the nature of the application 210. For example, each session might be defined as a day (or a week, month, etc.) in a gamification system for sales people, as a single round in a video game, or a single sitting for a tutoring system. Each session may have one or more associated action(s) and user.

Data Collection 440

After the input feature(s) 240 and/or the output feature(s) 250 have been identified, the optimization method 400 may proceed to a step 440 in which data is collected regarding the identified input feature(s) 240, output feature(s) 250, and/or target component(s) 230. This data may take the form of measurements made, for example, by the optimization system 300 of the various input feature(s) 240 and/or output feature(s) 250. This can be done by querying any data storage medium, such as the database 107 and/or the candidate artificial intelligence models 112. Each different feature may define a subset of the available data that may facilitate learning carried out by the optimization method 400.

The input features 240 may be formatted into a training data set that can be used to induce a model to determine how to modify the user interface 220 for each user 100. The training data may consist of tuples $(x_i; p_i; q_i)$ where x and p have been defined previously, and q is a quality score that can be determined automatically or by an expert user.

To determine quality automatically, the optimization method 400 may first gather information regarding rewards. A reward $r_i$ may consist of both performance and user experience elements. User experience elements may include things such as (in the context of a video game) the player's degree of excitement, engagement, and interest. The performance may reflect the score or level achieved by the player (continuing the video game context). For the gamification (in sales) context, the user experience elements may include the sales agent's degree of excitement and satisfaction, where the performance may reflect the number of contacts made and/or deals closed.

The user experience elements of $r_i$ may be calculated automatically, for example (in the video game context) the degree of engagement may be measured by the duration of playing time, or may be calculated from user feedback (such as user ratings). Similarly, the performance elements may be calculated based on statistics and results directly obtained from the system that is being measured (such as the number of calls made by the sales agent).

The actual reward score $r_i$ may be calculated by taking a weighted average of each of the elements. For example, in the gamification for sales context, a formula such as the following may be used: $r_i = w_1 \cdot r\_excitement_i + w_2 \cdot r\_satisfaction_i + w_3 \cdot r\_contacts_i + w_4 \cdot r\_deals$. The weight vector w may be set differently depending on user preferences, manager decisions, or automatically through learning to reflect the relative importance of each of the elements when determining reward. A user or manager may set the reward weights to reflect which elements are most important or preferred. A company can set a global preference based on a company policy of preferring performance over user-experience (for example). An artificial intelligence method may learn from historical data to determine where the weights should be set. This can be done using, for example, a single-layer perceptron. Such a model can be used solely to determine weights, or an allowable range, starting point, or a specific value can be provided for one or any of the parameters, allowing the optimization system 300 to determine what the weight should be within the given constraints.

A quality value $q_i$ may be calculated from the reward $r_i$. The quality value $q_i$ may be normalized to the range $[-1, 1]$, with values greater than 0 for above average performance and values less than 0 for below average performance. An average reward $r\_average_i$ may be estimated based on previous performance data of the same user and the average performance in a group setting.

For individual users (such as a user in a video game setting), $r\_average_i$ may be a weighted moving average of previous reward data. A previous reward may be $r_i(t)$, where t is the number of the previous value, starting with t=1 as the most recent value, t=2 as one value prior to t=1, ..., and t=n being one value prior to t=n-1. Previous rewards may be $\{r_i(1), r_i(2), \ldots\}$. The following formula may apply: $r\_average_i = [r_i(1) + a \cdot r_i(2) \cdot a^2 \cdot r_i(3) + \ldots + a^{n-1} \cdot r_i(n)] / [1 + a + a^2 + \ldots + a^{n-1}]$, where a is a discount value in the range $[0, 1]$ (such as a=0.2) so that the most recent value will be weighted more. The value n may be the range of previous values to be considered (for example, if n=5, the previous five values may be considered).

If a user is in a group setting (such as gamification for a group of salespeople), the following may be used to calculate the average: $r\_average_i = \theta \cdot r\_average_i + (1-\theta) \cdot group\_average$ where $\theta$ is a configurable weight in the range $[0, 1]$. The value of groupaverage may be calculated by averaging $r\_average_i$ over all values of i in the group. The value for $r\_average_i$ may be calculated as in the equation provided previously.

Similarly, the values for minimum $r\_min_i$ and maximum $r\_max_i$ rewards may be calculated based on previous performance of both the user and the group and/or team, for example, based on variance and/or average of previously calculated rewards). For example, where $d_i$ is the standard deviation of the previous data, the following may apply: $r\_max_i = r\_average_i + c \cdot d_i$ and $r\_min_i = r\_average_i - c \cdot d_i$ where c is a value (c>0). For example, it may be assumed that c=2. When there is no historical data, users or managers can set the minimum and/or maximum values by hand, or the optimization system 300 may set the values based on historical data from other users that have used the system 200 in the past. By way of example, the value for $q_i$ may be calculated as follows.

If $r_i \geq r\_max_i$, then set $q_i=1$. If $r_i \leq r\_min_i$, then set $q_i=-1$. If $r\_max_i > r_i > r\_average_i$ then set $q_i = [r_i - r\_average_i] / [r\_max_i - r\_average_i]$. If $r\_average_i > r_i > r\_min_i$, then set $q_i = [r\_average_i - r_i] / [r\_average_i - r\_min_i]$.

This quality score may be used to augment the collected training data. A training data set where each training instance has a quality value can be used in Instance Weighted Learning (IWL) to improve the model. Traditional machine learning may treat all instances as equally weighted, where IWL may weight each instance by the given quality score. IWL may be used with a variety of machine learning algorithms and/or other artificial intelligence algorithms, such as multi-layer perceptrons, decision trees, and nearest neighbor-based algorithms.

Data on personality types may be obtained from previously taken survey data, if available. The sign-up steps for using the system may include an option for users to voluntarily provide survey data for personality types. Users may also have an option to add personality data any time after starting to use the system. There may be an incentive for users to provide personality data since doing so may improve the user's performance and enhance the user experience. Similarly, data collection processes can be applied to collect demographic data from users.

Artificial Intelligence Algorithm Selection 450

Once the data has been collected, the optimization method 400 may proceed to a step 450 in which one or more of the candidate artificial intelligence models 112 are selected to provide the selected artificial intelligence models 330. This may be done procedurally using meta-learning methods, as is known in the art. A model may be built a priori that predicts the best of the candidate artificial intelligence models 112 to use for a given set of data.

By way of example, for each content presentation policy $p_j$ (j=1, ..., m), using the policy for timing a widget, one of the candidate artificial intelligence models 112 may be selected: MLA_set=$\{MLA_1, MLA_2, \ldots, MLA_K\}$. For example, let $MLA_1$ be a multi-layer perceptron, $MLA_2$ be a support vector machine, and $MLA_3$ be a decision tree (and so on).

A training set may be collected from all users (i=1, ..., n) with regard to policy j. Let this training data be s, as follows: $s_j = \{s_{1,j}, s_{2,j}, \ldots, s_{n,j}\}$ where $s_{1,j}$ is all the training data from user 1 regarding policy j, $s_{2,j}$ is all the training data from user 2 regard policy j, etc.: $s_{i,j} = \{x_i, p_i, q_i, t\}$ where t is a previous time step t.

The following method may be used to evaluate the performance for a given $MLA_k$ on policy j:

1. Divide $s_j$ into L folds (such as L=10 as in the following examples).
2. In each iteration e of 10-fold cross validation, nine folds are used as a training set $Train_e$ and one fold is used as a test set $Test_e$.
3. Train $MLA_k$ on $Train_e$.
4. During training on $Train_e$, $Train_e$ can be divided into two subsets, one for training and one for validation, to select the best parameters for the algorithm.
5. Test $MLA_k$ on $Test_e$, record the performance as $Perf_e$.
6. Repeat for a total of ten times, with a different fold as test set in each iteration.
7. Average over ten iterations: Performance_Average$_k$ = $(Perf_1 + \ldots + Perf_{10})/10$.

The above method may be repeated for all K candidate artificial intelligence algorithms in MLA_set. The algorithm $MLA_{best}$ with the highest performance may be selected: $MLA_{best}$=arg_max(Performance_Average$_k$)(k=1, 2, ..., K). A student t-test may be used to estimate the confidence level of the difference in performance between algorithms. When using the t-test, the samples may be paired comparisons in the ten folds (assuming that all MLA are tested on the same partitions of the ten folds). If two top algorithms have no significant difference in performance, experts or users may decide which one to use.

For a better evaluation, a stratified 10-fold cross-validation may be used. In this case, ten folds may have to be divided based on user data $s_{i,j}$ instead of combined data $s_j$. Thus, the data distribution may be balanced among the ten folds for each user.

Reporting

As an optional step (not shown in FIG. 4), after the selected artificial intelligence model(s) 330 have been selected, the results of the selection process may be reported to a user such as an administrator of the optimization system 300 or a supervisor of the user 100. The reporting step may present such a user with helpful information on the decision-making process within the framework so as to increase the confidence level in the optimization system 300. For example:

- For algorithm selection, the system may be able to display the ranking of the algorithms along with the significance level in the performance differences.
- May display the size of the training data for training artificial intelligence components.
- May display the time span from which training data has been collected.
- For the best policy, may display the difference in performance between the best policy and the second best policy.
- May display decision-making rules in human-comprehensible formats if feasible (such as the format typically seen from decision trees).
- May analyze the data and provide users with discovered rules, if any, such as association rules and correlations between KPIs and KPMs.
- May evaluate parameter settings by users and make recommendations for optimized parameter settings.
- For each adaptation step, it can keep a history of each modified value by adaptation. It may provide a log of all of the modified values and timestamps.
- Try to provide users with reasons on why each adaptation occurs. If feasible, may also provide a confidence level on potential improvement for each adaptation step.
- May allow a feedback loop to receive a rating for each adaptation step if users choose to analyze each adaptation step. Such data may be included in training and model building processes.
- Allow user to set adaptation frequency (or range of frequencies) for each type of content.
- Allow user to set a plastic parameter from the range [0, 1] for each type of content. For example, a user may set the parameter for a type of content to 0.9, requiring the content to be more static, or to 0.1 to allow the content to be more dynamic.

The system may use the information generated from the reporting step to periodically (i.e. hourly, daily, weekly) update the input data, retrain the artificial intelligence models, and thus adapt and improve performance over time and with increased system use.

Artificial Intelligence Algorithm Application 460

Once the best of the candidate artificial intelligence models 112 have been selected to provide the selected artificial intelligence model(s) 330, the selected artificial intelligence model(s) 330 may be applied 460 to the system 200 to enhance the performance and/or motivation of the single user 100 by making changes to the user interface 220 of the application 210. More precisely, each of the selected artificial intelligence models 330 may be applied to the target component 230 for which it was selected.

This application process may entail iterating through the process of changing each target component 230 until each target component 230 has reached its optimal configuration. Thus, the optimization system 300 may change each of the target components 230 many times, measure the impact of the change on performance and/or motivation of the single user 100, and then make further changes as directed by the corresponding single selected artificial intelligence model 330.

In this manner, all of the target components 230 selected for optimization by the optimization system 300 may be optimized. As a result, the application 210 may operate with the best possible user performance and/or motivation that can be achieved through adjustment of the user interface 220 of the application 210.

Adaptive Gamification Example

As mentioned previously, the systems and methods of the present invention may be applied to a wide variety of computer applications. In one example, the optimization method 400 may be applied to a gamification system that adapts to its users. Through application of the optimization method 400, the gamification system may learn which gamification items, such as achievements and notifications, are best to present to users and how best to present these items to the users. The optimization method 400 may also provide mechanisms whereby the gamification system can learn about the user, adapting gamification elements to their personality and demographics, and using how they perform and what they perform well with to improve and refine the understanding of that user.

As an example model generated by the framework, a genetic algorithm with a neural network may be used as part of the fitness function. The optimization method 400 may also provide mechanisms whereby the generated machine learning systems (or other artificial intelligence systems) for adaptive gamification can start with little or no data to train on, and will generate their own training data to work with to further adapt to users.

Target Component Identification

In adaptive gamification, there are several different user interface components that can be selected for optimization. Each may provide a different piece of content that can be adapted to the user. Some examples are presented in the following, non-exclusive list:

- Widgets (tool used to display performance metrics)
- Notification content (messages about the user accomplishing goals, winning/losing challenges or tournaments, changing ranks for a given performance metric, etc.)
- Notification timing/display length/location/aesthetics
- Rewards (given for reaching goals such as achievements)

A wide variety of other aspects of the gamification system user interface may also be identified for use as target components according to the invention.

Input and Output Feature Identification

There are some specific input features that may be unique to adaptive gamification that can be used for an optimization method such as the optimization method 400. For example, a unique point system may be created that assigns a point value to each action tracked by the gamification system (such as a phone call made to a lead, appointment set, sale made, etc.). These points may be used in competitions, as attributes, and to provide a ranking of users that works across different companies. Other examples of gamification features include how often a user wins challenges/tournaments/races, how many rewards the user has accumulated, and how much the user participates in the gamification features. The demographic features and the personality profile features may also be important.

Data Collection

Data may advantageously be collected to whatever extent possible before a user starts using the adaptive gamification system. The data can come from valid data source such as a MySQL database, a NoSQL database, or a simple file format, among others. In addition, the adaptive gamification system may have data being generated on an ad hoc basis, and may need to be able to adapt to situations as they arise.

Artificial Intelligence Algorithm Selection

There are no special restrictions on the algorithm selection process for adaptive gamification over any other adaptive user interface system. Any well-known machine learning or artificial intelligence algorithm may be used.

Reporting may include information about user performance, system use, errors, system decision-making, information for parameter tuning, or new concepts for groupings learned by the system. This information may be printed, stored, e-mailed, or otherwise transmitted to any suitable device, such as a standard command line interface, an output file, a database, a printer etc. Such reporting may be used by a human to better tune system performance, to inform decision-making with regards to employees or customers, or by the system itself (such as the optimization system 300) to automatically make updates to users, parameters, and other settings.

Artificial Intelligence Algorithm Application

Once the artificial intelligence algorithms have been selected, they may be used to iteratively change the target components of the user interface of the gamification system. Such changes may be performed iteratively, and with limited difference between adjacent iterations, to minimize visibility of the changes to the user.

Example Embodiment—Adaptive Widgets

In many implementations of gamification systems, there may be a need to display performance metrics. An application that displays performance metrics may be termed a "widget." There is also the possibility of displaying a widget that measures a whole team's performance with respect to each other in a leader board. The leader board may provide a ranked list of the users, as well as the current value of the given performance metric. In the adaptive gamification framework, the optimization method 400 may provide mechanisms whereby adaptive widgets can be displayed. These widgets may show different metrics over time as more is known about a user's preferences and performance under different metrics.

Figure 5:
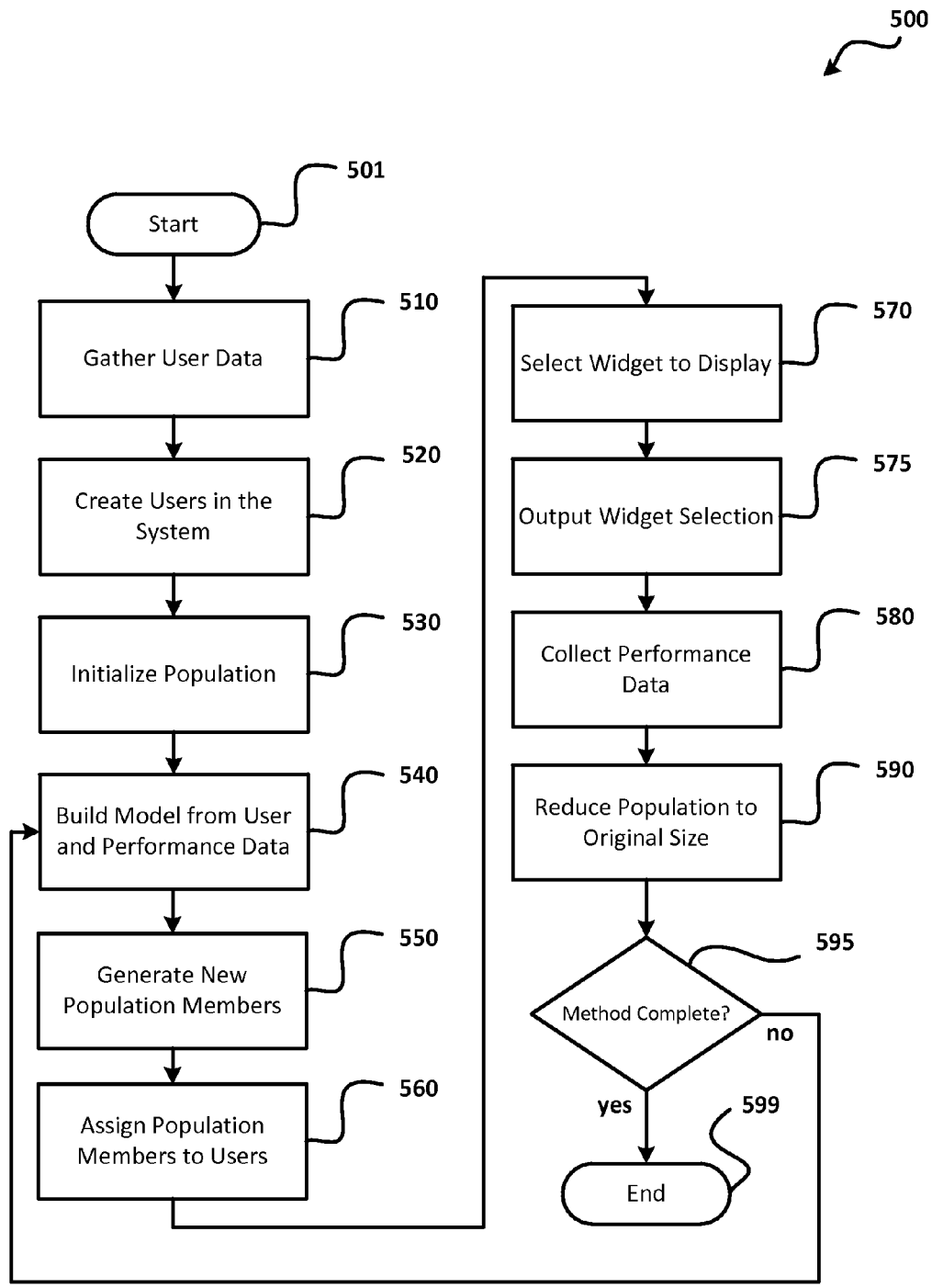
FIG. 5 is a flowchart diagram illustrates one method of using an optimization method such as the optimization method of FIG. 4 in the context of an adaptive gamification framework.

Referring to FIG. 5, a flowchart diagram illustrates one method 500 of using an optimization method such as the optimization method 400 of FIG. 4 in the context of an adaptive gamification framework. The example implementation may use a genetic algorithm with a neural network as part of the fitness function.

The method 500 may start 501 with a step 510 in which user data is gathered. The method 500 may then proceed to a step 520 in which users are created in the system, then to a step 530 in which the population is initialized, and then to a step 540 in which a model is built from user and performance data. The method 500 may then proceed to a step 550 in which new population members are generated, a step 560 in which population members are assigned to users, and a step 570 in which a widget to display is selected.

The method 500 may then proceed to a step 575 in which the widget selection is output to a user such as a system administrator or supervisor. The method 500 may then proceed to a step 580 in which performance data is collected, then to a step 590 in which the population is reduced to its original size. In a query 595, if the method 500 is not yet complete, the step 540 may be carried out again, and so on through the step 590 until the method 500 is complete. The method 500 may then end 599. The manner in which these steps may be carried out will be described in greater detail, as follows.

Adaptive Widgets—Genetic Algorithm

The genetic algorithm may use a genome that looks like the following example $G_1$. This example assumes that there are three performance metrics to choose from: $m_1$, $m_2$, and $m_3$. In this example, $G_1$=0.7; 0.2; 0.1; 0.03; 0.01.

The first three numbers may represent the probability of selecting $m_1$, $m_2$, and $m_3$ respectively. The fourth and fifth numbers may be the probabilities $P_{rr}$ and $P_{rg}$ respectively (these will be discussed later).

Examples of different metrics may include:
Number of dials
Number of times contact is made
Number of leads converted
Number of leads qualified
Number of deals closed
Size of deals
Number of appointments made The genetic algorithm may have a population size of n, a number of users m, a selection function that chooses one member of the population for each user, a fitness function to determine which members of the population are selected for crossover and survival, and a mutation parameter that determines how often mutations occur.

Population size may stay constant between iterations at n; only a predetermined number of individuals may survive each iteration. The top n members of the population (which can also be selected probabilistically based on fitness) may survive each round.

Each time period, a new metric for display may be chosen based on the probabilities given by the genome for that individual. Potentially, each user may have a different metric displayed. For large, group displays, a "group user" may be generated that is an aggregate of the performance of the group. This "group user" may have its own paired individual from the population.

Every day, a new generation may be produced, with new members of the population being produced by cross-over and mutation. A new individual may be selected by the selection function for each user of the system. The previous day's performance may be paired with the user-individual pairs, and may be fed into the training data for the selection algorithm.

These time intervals may be selected arbitrarily, and may be selected by a manager, or a learning algorithm may be developed to determine which intervals perform the best.

Users may also mark metrics as favorites. This marking may be used to help inform the selection function.

Mutations may be similar to the standard mutations found in genetic algorithms. These can include slightly perturbing a value, swapping two values, and having a value modified by a large amount. It may be desirable for good options to remain in the population once discovered, and it may be desirable to reduce (or completely remove) the amount of genetic mutations over time.

The fitness function may be a composite of the number of times an individual in the population is selected and the quality of the performance that each user paired with that individual had.

Previous fitness values may also be kept in the following fashion: fitness(x)=(previous_fitness(x)*a)+current_fitness(x) where previous_fitness is the fitness value from the previous generation, a is a discount value for previous fitness values, and current_fitness is the fitness score calculated for the current generation.

Adaptive Widgets—Selection Function

The selection function may have a neural network to give a scoring for each pair that consists of a user and an individual from the population. The neural network may take as input two different sets of features. The first set may be the individual from the population. The second set may be a variety of information about the user. The output may be a score predicting how well the user will perform for the given individual. To incorporate both past and current training data, it may be desirable to have a per-instance learning rate. Newer instances may have a higher learning rate, older instances may have a smaller learning rate, and instances that have aged to the point of having a learning rate of 0 may be removed. If no training data is available to start with, random selection may be used. After a few generations of random selection have passed, it may be appropriate to start to rely more on the learned model, until enough data is available to completely remove the random selection.

Examples from the set of engineered features that represent the user include, but are not limited to, the following:
# of Achievements
# of Challenges (given, accepted, won)
# of Group Goals/Campaigns
Demographic information
Information about the position
Past performance
Persogenics scores
Other input and/or output features may additionally or alternatively be used.

Adaptive Widgets—Gamification Concepts

There are several gamification concepts that such a system may include. These concepts include, but are not limited to, the following:
Recurring Achievements (example: an achievement for every 100 dials).
Random Rewards (Generate a reward at random time intervals or with a random probability after events, this is the $P_{rr}$ from the example $G_1$ given earlier).
Randomly Generated Goals (This is a randomly generated "achievement,"); this is the $P_{rg}$ from the example $G_1$ given earlier).
A ratio of random rewards vs. achievement based rewards.
Different reward schedules/policies, either learned or manually crafted.
Automatically generate achievements based on the metric distribution found in the user's currently selected individual from the population.
Automatically select achievements to display in the UI (esp. those that may be close to completion) based on the metric distribution from the user's current individual.

It may be especially interesting to investigate the different effect of randomly-generated rewards (based on intermittent reinforcement and natural pattern seeking in random events) and achievement-based awards (based on current gamification practice). Randomly generated rewards may still work even if the user knows they are random, as evidenced by the success of gambling and other stochastic processes.

An important aspect of a gamification system may be the reward mechanism. What are rewards, how are they delivered, what can they be used for, what incentive does the user have to obtain further rewards, and when are they given out? These are all questions that may be important to the function of the system. Reward policies may be manually generated or learned and/or synthesized using artificial intelligence algorithms.

Adaptive Widgets—Example

Figure 6:
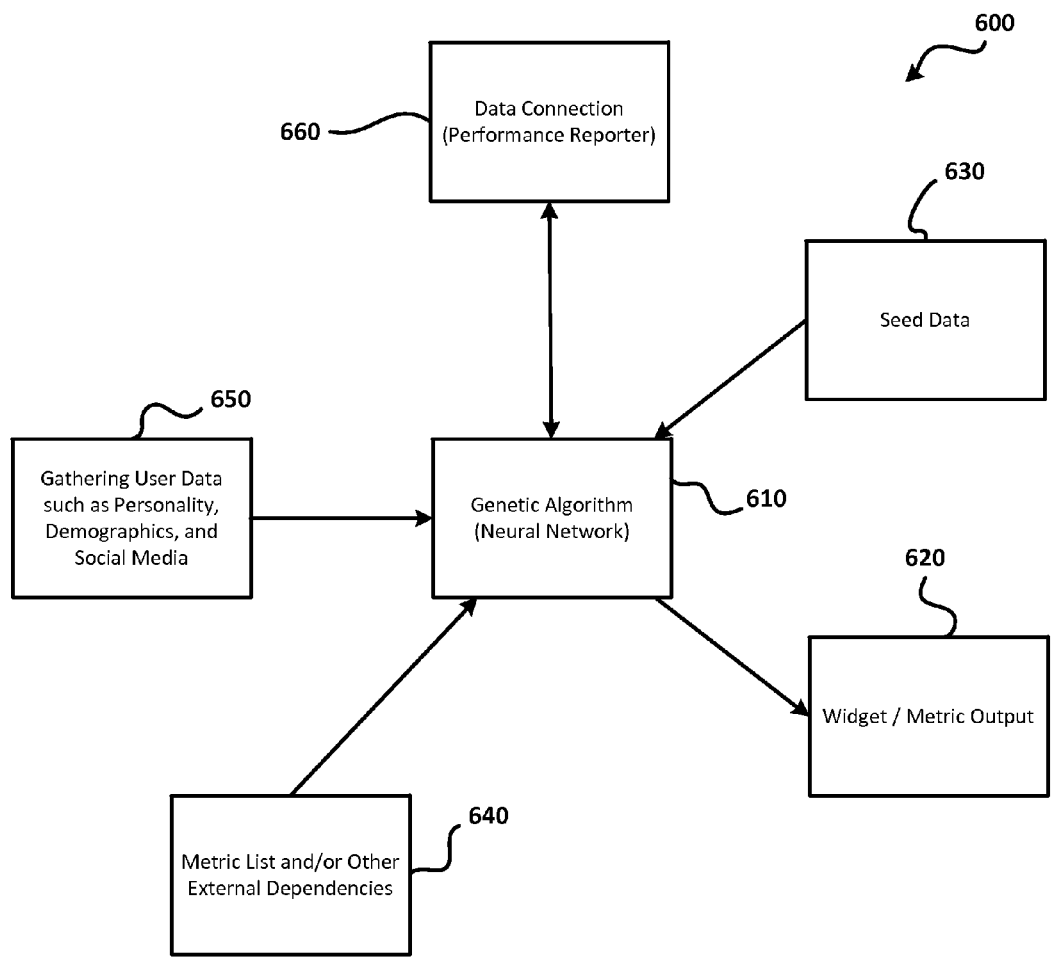
FIG. 6 is a schematic diagram illustrating a system for application of a method, such as the optimization method of FIG. 4, to active widgets.

Referring to FIG. 6, a schematic diagram illustrates a system 600 for application of an optimization method, such as the optimization method 400 of the present invention, to active widgets. The system 600 may utilize a genetic algorithm 610 that takes a set of users as input and provides, as output, widgets and/or metrics 620. The genetic algorithm 610 may commence with seed data 630 that facilitates initial iterations. A metric list and/or list of external dependencies 640 may also be used to define metrics and/or other parameters for the operation of the genetic algorithm 610.

These users may have preference values for each of the performance metrics. The users may also have user data 650 that is gathered and used as input for the genetic algorithm 610. There may also be three attributes, with two real-valued attributes being used as noise and with the one Boolean attribute that is correlated with the performance metrics. These three attributes may be used as input features to the genetic algorithm 610. The performance metrics may be gathered and reported to the genetic algorithm 610 through the use of a data connection 660.

For a given individual from the population i, the selection function may return a set of users u that all have selected that individual for this generation. Each user may have a set of preferences p and each i may have a set values m for the performance metrics. The fitness function for i may be calculated by taking the average dot product m·p for all sets of preferences p from u.

The optimization method 400 may be able to assign an individual i to each user where the maximal user preference is for the same metric as the highest valued metric for the given i. In other words, it may assign individuals such that argmax (m)=argmax(p) holds true.

For an initial population size of 100 and 3 performance metrics, the genetic algorithm may run for 50 generations. After these 50 generations, the algorithm may have assigned appropriate individuals to all of the users with between 80% and 90% accuracy.

One skilled in the art will recognize that the examples depicted and described herein are merely illustrative, and that other arrangements of user interface elements can be used. In addition, some of the depicted elements can be omitted or changed, and additional elements depicted, without departing from the essential characteristics of the invention.

The present invention has been described in particular detail with respect to possible embodiments. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, or entirely in hardware elements, or entirely in software elements. Also, the particular division of functionality between the various system components described herein is merely exemplary, and not mandatory; functions performed by a single system component may instead be performed by multiple components, and functions performed by multiple components may instead be performed by a single component.

Reference in the specification to "one embodiment" or to "an embodiment" means that a particular feature, structure, or characteristic described in connection with the embodiments is included in at least one embodiment of the invention. The appearances of the phrases "in one embodiment" or "in at least one embodiment" in various places in the specification are not necessarily all referring to the same embodiment.

In various embodiments, the present invention can be implemented as a system or a method for performing the above-described techniques, either singly or in any combination. In another embodiment, the present invention can be implemented as a computer program product comprising a non-transitory computer-readable storage medium and computer program code, encoded on the medium, for causing a processor in a computing device or other electronic device to perform the above-described techniques.

Some portions of the above are presented in terms of algorithms and symbolic representations of operations on data bits within a memory of a computing device. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing module and/or device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention can be embodied in software, firmware and/or hardware, and when embodied in software, can be downloaded to reside on and be operated from different platforms used by a variety of operating systems.

The present invention also relates to an apparatus for performing the operations herein. This apparatus may be specially constructed for the required purposes, or it may comprise a general-purpose computing device selectively activated or reconfigured by a computer program stored in the computing device. Such a computer program may be stored in a computer readable storage medium, such as, but is not limited to, any type of disk including floppy disks, optical disks, CD-ROMs, DVD-ROMs, magnetic-optical disks, read-only memories (ROMs), random access memories (RAMs), EPROMs, EEPROMs, flash memory, solid state drives, magnetic or optical cards, application specific integrated circuits (ASICs), or any type of media suitable for storing electronic instructions, and each coupled to a computer system bus. Further, the computing devices referred to herein may include a single processor or may be architectures employing multiple processor designs for increased computing capability.

The algorithms and displays presented herein are not inherently related to any particular computing device, virtualized system, or other apparatus. Various general-purpose systems may also be used with programs in accordance with the teachings herein, or it may prove convenient to construct more specialized apparatus to perform the required method steps. The required structure for a variety of these systems will be apparent from the description provided herein. In addition, the present invention is not described with reference to any particular programming language. It will be appreciated that a variety of programming languages may be used to implement the teachings of the present invention as described herein, and any references above to specific languages are provided for disclosure of enablement and best mode of the present invention.

Accordingly, in various embodiments, the present invention can be implemented as software, hardware, and/or other elements for controlling a computer system, computing device, or other electronic device, or any combination or plurality thereof. Such an electronic device can include, for example, a processor, an input device (such as a keyboard, mouse, touchpad, trackpad, joystick, trackball, microphone, and/or any combination thereof), an output device (such as a screen, speaker, and/or the like), memory, long-term storage (such as magnetic storage, optical storage, and/or the like), and/or network connectivity, according to techniques that are well known in the art. Such an electronic device may be portable or non-portable. Examples of electronic devices that may be used for implementing the invention include: a mobile phone, personal digital assistant, smartphone, kiosk, server computer, enterprise computing device, desktop computer, laptop computer, tablet computer, consumer electronic device, or the like. An electronic device for implementing the present invention may use any operating system such as, for example and without limitation: Linux; Microsoft Windows, available from Microsoft Corporation of Redmond, Wash.; Mac OS X, available from Apple Inc. of Cupertino, Calif.; iOS, available from Apple Inc. of Cupertino, Calif.; Android, available from Google, Inc. of Mountain View, Calif.; and/or any other operating system that is adapted for use on the device.

While the invention has been described with respect to a limited number of embodiments, those skilled in the art, having benefit of the above description, will appreciate that other embodiments may be devised which do not depart from the scope of the present invention as described herein. In addition, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

What is claimed is:

1. A computer-implemented method for optimizing a user interface of a computing system using artificial intelligence, comprising:
    at a processor, identifying a first target component of the user interface, wherein the first target component is perceptible to a user via an output device;
    at the processor, identifying at least one first output feature representing a measured indicator of at least one of performance and motivation of the user;
    at the processor, identifying at least one first input feature comprising at least one of:
        a first measured aspect descriptive of the user; and
        a first measured aspect descriptive of the user's interaction with the computing system;
    at the processor, collecting data comprising a plurality of input measurements of the first input feature and a plurality of output measurements of the first output feature;

at the processor, selecting a first selected artificial intelligence algorithm to maximize the first output feature for the user, based on comparison of the plurality of input measurements and the plurality of output measurements with a plurality of candidate artificial intelligence algorithms; and at the processor, applying the first selected artificial intelligence algorithm to maximize the first output feature for the user by changing the first target component.

2. The method of claim 1, further comprising:
at the processor, identifying a plurality of additional output features tracked by the computing system; and
at the processor, mathematically combining the plurality of additional output features with the first output feature to define a composite output feature;
wherein the data further comprises a plurality of output measurements of the composite output feature.

3. The method of claim 1, wherein the first output feature measures user activity tracked by the computing system.

4. The method of claim 1, wherein the first output feature measures user motivation in relation to activity tracked by the computing system.

5. The method of claim 1, further comprising:
at the processor, identifying a second output feature representing a measured indicator of at least one of performance and motivation of the user;
at the processor, identifying a second target component of the user interface, wherein the second target component is perceptible to the user via the output device;
at the processor, identifying a second input feature comprising at least one of:
a second measured aspect descriptive of the user; and
a second measured aspect descriptive of the user's interaction with the computing system;
at the processor, selecting a second selected artificial intelligence algorithm to maximize the second output feature for the user, based on comparison of the plurality of input measurements and the plurality of output measurements with the plurality of candidate artificial intelligence algorithms; and
at the processor, applying the second selected artificial intelligence algorithm to maximize the second output feature for the user by changing the second target component;
wherein the data further comprises a plurality of input measurements of the second input feature and a plurality of output measurements of the second output feature.

6. The method of claim 1, wherein the first target component comprises a message delivered to the user by the computing system.

7. The method of claim 6, further comprising:
at the processor, identifying a plurality of candidate messages for the message; and
at the processor, ranking the candidate messages based at least in part on a frequency of use of language in each of the plurality of candidate messages outside the computing system;
wherein changing the first target component comprises changing the message to a selected message of the plurality of candidate messages.

8. The method of claim 1, wherein the output device comprises a display screen, and wherein the first target component comprises a content display policy that controls how the user interface displays information to the user on the display screen.

9. The method of claim 8, further comprising:
at the processor, quantifying possible changes to the content display policy based on user awareness of the possible changes; and
at the processor, determining a maximum change in the content display policy that will avoid distracting the user;
wherein changing the first target component comprises changing the content display policy by a variation no greater than the maximum change.

10. The method of claim 1, wherein the first target component comprises award criteria for issuance of an adaptive reward to the user, the method further comprising:
at the processor, determining that the user has accomplished a goal prior to issuance of the adaptive reward; and
notifying the user through the user interface that the adaptive reward has been issued.

11. The method of claim 10, wherein the award criteria comprises a plurality of user-specific award criteria, each of which applies to one of a plurality of users of the computing system.

12. The method of claim 1, further comprising:
at the processor, identifying a plurality of additional input features, each comprising at least one of:
a measured aspect descriptive of the user; and
a measured aspect descriptive of the user's interaction with the computing system;
wherein the data further comprises a plurality of additional input measurements of each of the plurality of additional input features;
and wherein selecting the first selected artificial intelligence algorithm further comprises basing the selection on comparison of the plurality of additional input measurements and the plurality of output measurements with the plurality of candidate artificial intelligence algorithms.

13. The method of claim 1, wherein the first input feature comprises a personality type of the user.

14. The method of claim 1, wherein the first input feature comprises a demographic of the user.

15. The method of claim 1, wherein the first input feature comprises an action taken by the user relative to the user interface.

16. The method of claim 1, wherein the data further comprise a plurality of reward scores, each of which is associated with one of the plurality of input measurements.

17. The method of claim 16, wherein the data further comprises a plurality of quality scores, each of which is associated with one of the plurality of input measurements to indicate a quality of the associated input measurement relative to the other input measurements.

18. The method of claim 1, wherein collecting the data is carried out prior to at least one of identification of the at least one first output feature, identification of the first target component, and identification of the at least one first input feature.

19. The method of claim 1, wherein collecting the data is carried out after identification of the at least one first output feature, identification of the first target component, and identification of the at least one first input feature.

20. The method of claim 1, wherein selecting the first selected artificial intelligence algorithm comprises selecting at least one of:
an instance weight learning algorithm;
a genetic algorithm;
a single-layer perceptron;
a multi-layer perceptron;

a decision tree;
a support vector machine;
a naïve Bayes classifier;
a nearest neighbor-based algorithm;
a neural network;
a multiple output dependence algorithm;
a hierarchical based sequencing algorithm;
a multiple output relaxation algorithm;
a deep learning algorithm;
a derivative of an artificial intelligence algorithm; and
a combination of at least two artificial intelligence algorithms.

21. The method of claim 1, wherein applying the first selected artificial intelligence algorithm comprises:
at the processor, identifying a plurality of versions of the first target component; and
at the processor, iterating through the plurality of versions of the first target component to identify a selected version of the plurality of versions that yields optimal results for at least one of performance and motivation of the user.

22. The method of claim 1, wherein the first selected artificial intelligence algorithm comprises a machine learning algorithm.

23. A computer program product for optimizing a user interface of a computing system using artificial intelligence, comprising:
a non-transitory computer-readable storage medium; and
computer program code, encoded on the medium, configured to cause at least one processor to perform the steps of:
identifying a first target component of the user interface, wherein the first target component is perceptible to a user via an output device;
identifying at least one first output feature representing a measured indicator of at least one of performance and motivation of the user;
identifying at least one first input feature comprising at least one of:
a first measured aspect descriptive of the user; and
a first measured aspect descriptive of the user's interaction with the computing system;
collecting data comprising a plurality of input measurements of the first input feature and a plurality of output measurements of the first output feature;
selecting a first selected artificial intelligence algorithm to maximize the first output feature for the user, based on comparison of the plurality of input measurements and the plurality of output measurements with a plurality of candidate artificial intelligence algorithms; and
applying the first selected artificial intelligence algorithm to maximize the first output feature for the user by changing the first target component.

24. The computer program product of claim 23, wherein the first target component comprises a message delivered to the user by the computing system, the computer program product further comprising computer program code, encoded on the medium, configured to cause at least one processor to perform the steps of:
identifying a plurality of candidate messages for the message; and
ranking the candidate messages based at least in part on a frequency of use of language in each of the plurality of candidate messages outside the computing system;
and wherein changing the first target component comprises changing the message to a selected message of the plurality of candidate messages.

25. The computer program product of claim 23, wherein the computer program code configured to cause at least one processor to apply the first selected artificial intelligence algorithm comprises computer program code configured to perform the steps of:
identifying a plurality of versions of the first target component; and
iterating through the plurality of versions of the first target component to identify a selected version of the plurality of versions that yields optimal results for at least one of performance and motivation of the user.

26. The computer program product of claim 23, wherein the first selected artificial intelligence algorithm comprises a machine learning algorithm.

27. A system for optimizing a user interface of a computing system using artificial intelligence, comprising:
an output device, configured to output at least one target component of the user interface;
in input device, configured to receive at least one input feature;
at least one processor, communicatively coupled to the output device and the input device, configured to:
identify a first target component of the user interface, wherein the first target component is perceptible to a user via the output device;
identify at least one first output feature representing a measured indicator of at least one of performance and motivation of the user;
identify at least one first input feature comprising at least one of:
a first measured aspect descriptive of the user; and
a first measured aspect descriptive of the user's interaction with the computing system;
collect data comprising a plurality of input measurements of the first input feature and a plurality of output measurements of the first output feature;
select a first selected artificial intelligence algorithm to maximize the first output feature for the user, based on comparison of the plurality of input measurements and the plurality of output measurements with a plurality of candidate artificial intelligence algorithms; and
apply the first selected artificial intelligence algorithm to maximize the first output feature for the user by changing the first target component.

28. The system of claim 27, wherein the first target component comprises a message delivered to the user by the computing system, and wherein the at least one processor is further configured to:
identify a plurality of candidate messages for the message; and
rank the candidate messages based at least in part on a frequency of use of language in each of the plurality of candidate messages outside the computing system;
and wherein changing the first target component comprises changing the message to a selected message of the plurality of candidate messages.

29. The system of claim 27, wherein the at least one processor is configured to apply the first selected artificial intelligence algorithm by:
identifying a plurality of versions of the first target component; and
iterating through the plurality of versions of the first target component to identify a selected version of the plurality of versions that yields optimal results for at least one of performance and motivation of the user.

30. The system of claim 27, wherein the first selected artificial intelligence algorithm comprises a machine learning algorithm.

* * * * *